United States Patent [19]

Sterling, II

[11] Patent Number: 5,086,402
[45] Date of Patent: Feb. 4, 1992

[54] METHOD FOR HIGH SPEED DATA TRANSFER

[75] Inventor: Edward W. Sterling, II, Bolton, Mass.

[73] Assignee: Simware, Inc., Nepean, Canada

[21] Appl. No.: 528,339

[22] Filed: May 30, 1990

Related U.S. Application Data

[63] Continuation-in-part of Ser. No. 377,634, Jul. 10, 1989, abandoned.

[51] Int. Cl.⁵ .................. G06K 15/00; H04L 11/00
[52] U.S. Cl. ........................................................ 364/514
[58] Field of Search ............... 364/514, 131, 518, 521, 364/200, 900; 340/750, 799

[56] References Cited

U.S. PATENT DOCUMENTS

| 4,124,838 | 11/1978 | Washburn | 364/200 |
|---|---|---|---|
| 4,124,889 | 11/1978 | Kaufman et al. | 364/200 |
| 4,481,574 | 11/1984 | DeFino et al. | 364/200 |
| 4,712,188 | 12/1987 | Nishiyama | 364/750 |
| 4,750,137 | 6/1988 | Harper et al. | 364/514 |
| 4,837,679 | 6/1989 | Wiles, Jr. et al. | 364/514 |
| 4,853,875 | 8/1989 | Brown | 364/514 |
| 4,937,739 | 6/1990 | Ernst et al. | 364/521 |
| 4,941,193 | 7/1990 | Bransley et al. | 340/799 |
| 4,969,042 | 11/1990 | Houtman et al. | 358/903 |
| 4,972,261 | 11/1990 | Whalley et al. | 358/135 |
| 4,992,868 | 2/1991 | Holtz | 358/135 |

FOREIGN PATENT DOCUMENTS

| 1193745 | 9/1985 | Canada | 354/236 |
|---|---|---|---|
| 59-89056A | 12/1982 | Japan . | |
| 59-89056 | 5/1984 | Japan . | |
| 60-238976A | 11/1984 | Japan . | |
| 60-239143A | 11/1984 | Japan . | |

OTHER PUBLICATIONS

IBM Technical Disclosure Bulletin, vol. 21, No. 7, Dec. 1978, pp. 2633-2645.

Primary Examiner—Parshotam S. Lall
Assistant Examiner—Ellis B. Ramirez
Attorney, Agent, or Firm—Perman & Green

[57] ABSTRACT

The method of this invention comprises an efficient technique for transfer of information over a communication link between first and second processors, the processors employing blocks of data on a repetitive basis. Each processor includes means for storing copies of used blocks of data. A block of data currently used (or displayed) in the second processor is called an "old" data block and a block of data to be transmitted from the first processor to the second processor is called "new" data block. The method includes the steps of storing identical copies of used data blocks and the old data block in the memories of the first and second processors. The new data block is then compared in the first processor to stored data block copies to determine if the new data block equals a pre-established level of similarity with any of the stored data block copies. If a stored data block is found to equal the pre-established level of similarity with the new data block, the method contemplates transmission to the second processor of information regarding the differences between the new data block and the similar stored data block, as well as the identity of the similar stored data block. The second processor then proceeds to access its copy of the identified similar stored data block and to alter that data block in accordance with the difference information transmitted from the first processor.

31 Claims, 14 Drawing Sheets

SCROLL SCREEN DETECTION

METHOD FOR HIGH SPEED DATA TRANSFER

This patent application is a continuation-in-part of U.S. patent application Ser. No. 07/377,634 filed Jul. 10, 1989, of E. W. Sterling, II, now abandoned.

FIELD OF THE INVENTION

This invention relates to block data transfers between processors and, more particularly, to a method for enhancing the speed of block data transfers between a host processor and a remotely located display terminal.

BACKGROUND OF THE INVENTION

Host processors or "mainframes" are often interconnected with a plurality of display terminals that enable user interaction with the host. The display terminals are typically found remotely located and are connectable with the host via the dial-up telephone network. Standard voice-grade telephone lines support asynchronous communications using ASCII character sets to encode the data. These lines typically transfer data at 1200–2400 bits per second. Certain modem makers are now marketing 9,600 and even 19,200 bits per second modems which provide considerably enhanced data transmission speeds; however, due to the lack of standardization and little movement by host manufacturers to provide high speed asynchronous access to their mainframes, many display terminals are still interconnected in the low-speed regime i.e. 1200–2400 bits per second. At such speeds, 10 to 20 seconds is required to change a display screen image, depending upon the host's workload and intermediate loads on the public data network. This problem is not present in local area networks, as data throughput therein is in the megabyte range and screen update is accordingly faster.

Previously, efforts have been made to increase data transmission speeds between a host computer and display terminals so that the inherent delays which result from the use of low-speed modems and switched networks are minimized. In U.S. Pat. No. 4,750,137 to Harper et al, a method, sometimes called the "delta" method, is disclosed for reducing the amount of data transferred between a host and an interconnected display terminal to increase the speed of updating of the display. The host retains an image of the present display and compares that image with a new display to be transferred to the terminal. Subsequent to the comparison, the host configures a data train which only contains indications of the differences between the present and new screens. This optimization is also extended to handling field attribute bytes which, for example, instruct the terminal how certain characters should be shown, i.e., bright, half-bright, flashing, etc. Attribute bytes may also permit or prevent the modification of certain fields on the display.

Others have provided similar types of transmission improvement protocols. The IBM Corporation has, for a number of years, provided a computer program known as the "Interactive System Productivity Facilities/Program Development Facility". That program compares, on a field-by-field basis, a memory image of the expected state of a remote terminal screen prior to an updating transmission, with a similar image of the state of the screen expected to occur following the updating transmission. It appears that this comparison is performed only if field boundaries have not changed. Any field in the updated-state image that exactly matches the corresponding filed in the present-state image is not transmitted. It also appears that in any field wherein an exact match does not exist, all characters in that field before and after the mismatch, are transmitted regardless of whether the mismatch continues to other characters in the field.

In Canadian Patent 1,193,745 to Bernstein, still another fast response transmission technique is disclosed. That patent describes a method for creating an illusion of increased retrieval speed of data from a storage disk. The Bernstein method describes a program which directs a communication controller to format information responses from a hard disk into two-message blocks, the first block being a short, fixed length that provides a fast response to a user's inquiry and the other block comprising the balance of the information response. The first sub-message is just long enough to fill one screen and the second sub-message may be the balance of a multiscreen image. The arrangement provides information which is immediately accessible to the user and subsequently provides additional information, while the user is engaged in reading the first screen.

Of the prior art known to Applicant, the "delta" process described by Harper et al is an effective technique for increasing data transfer between a host and remotely located display terminals. Nevertheless, it suffers from a number of drawbacks in actual use. For instance, so long as the currently displayed screen only differs from the new screen by a small amount, the delta corrections can be made rapidly and the data transferred efficiently. On the other hand, where a simple screen action such as a scroll occurs, then there is a substantial lack of identity between the current screen and the new screen and time is lost in the delta comparison process. Likewise, if there is a complete change of screen to another previously used screen, again the delta process bogs down as the comparison between the new and current screens is an essentially useless effort due to the screens being entirely different in character and content.

Accordingly, it is an object of this invention to provide an improved method for transfer of blocks of data from a host processor to another processor.

It is another object of this invention to provide an improved method for block data transfers between processors wherein delta comparison between new and old blocks of data is substantially enhanced by preprocessing.

It is a further object of this invention to provide an improved method of screen transfer between a host computer and a remotely located display terminal, wherein the display terminal is enabled to present a new screen in extremely rapid fashion.

SUMMARY OF THE INVENTION

The method of this invention comprises an efficient technique for transfer of information over a communication link between first and second processors, the processors repeatedly employing blocks of data. Each processor includes means for storing copies of used blocks of data. A block of data currently used (or displayed) in the second processor is called an "old" data block and a block of data to be transmitted from the first processor to the second processor is called a "new" data block. The method includes the steps of storing identical copies of used data blocks and the old data block in the memories of the first and second processors. The new data block is then compared in the first processor to stored data block copies to determine if the new data block equals a pre-established level of similarity with any of the stored data block copies. If a stored data block is found to equal the pre-established level of similarity with the new data block, the method contemplates transmission to the second processor of information regarding the differences between the new data block and the similar stored data block, as well as the identity of the similar stored data block. The second processor then proceeds to access its copy of the identified, similar stored data block and to alter that data block in accordance with the difference information transmitted from the first processor.

DETAILED DESCRIPTION OF THE INVENTION

In the discussion below, certain commands and program protocols will be described which are found in IBM main frames and display stations e.g., 3270 display stations, the 3278 terminal, etc. Also referred to are personal computers which can be caused to emulate a 3278 terminal by the inclusion of special purpose software such as the SIM3278 marketed by the Assignee of this application. It should be understood, however, that while reference is made to certain IBM products, the method of this invention is equally applicable to other host/display terminal systems. Furthermore, while the invention will be described in the context of a host/display terminal environment, it should be understood that the described interaction is between independent processors which are interconnected via a communications link. Thus, the explanation of the invention and the context of a host/display terminal environment is for illustrative purposes only.

Figure 1:
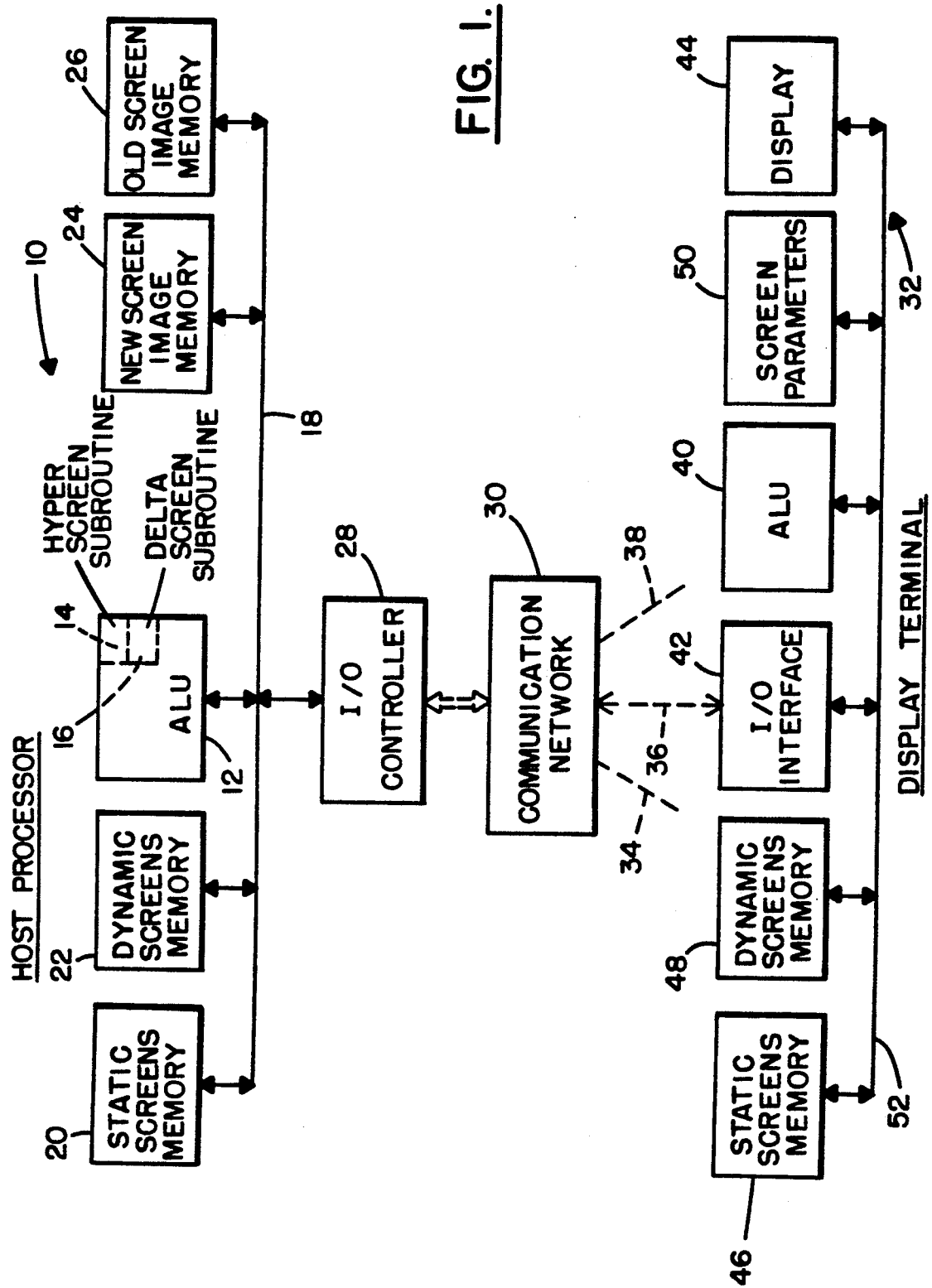
FIG. 1 is a high level block diagram showing a host processor and a display terminal interconnected by a telecommunications network.

Referring now to FIG. 1, a high level block diagram of a system which incorporates the invention is shown. Host computer 10 includes an arithmetic logic unit (ALU) 12 which is provided with several internal storage areas 14 and 16 for storing the hyper-processing routine and the delta routine. These sub-routines will be described in detail below. Arithmetic logic unit 12 is interconnected to other elements of the system via bus 18. The main memory for ALU 12 is shown in a segmented fashion and includes, among other areas, static screens memory 20, dynamic screens memory 22, new screen memory 24 and old screen memory 26. Each of these memories is interconnected with ALU 12 via bus 18. I/0 controller 28 provides access between bus 18 and the switched communication network 30. A plurality of display terminals 32 are interconnected to switched network 30 via lines 34, 36 and 38.

The structural arrangement of each display terminal, at the functional level, is much the same as host computer 10 and includes arithmetic logic unit 40, input/output interface 42 and display screen 44. The memory of display 32 is allocated into certain areas which, among others, includes static screens memory 46, recently used dynamic screens memory 48 and screen parameters memory 50. All of the aforementioned assemblies are interconnected via bus 52 in the well-known manner.

While, as aforestated, host computer 10 interacts with a plurality of terminals, for the purpose of discussion below, it will be assumed that only one terminal is interconnected, i.e. terminal 32. It should be understood however, that the operation of host processor 10 is substantially identical with respect to similarly connected terminals and that it's allocated memory areas are much larger in capacity than corresponding memory areas in any interconnected screen terminal, to accommodate the plurality of terminals.

Host processor 10 and display terminal 32 each contain identical libraries of screen images (i.e., blocks of data). Static screens memory 20 in host processor 10 and static screens memory 46 in display terminal 32 both contain identical copies of commonly used static screens which are employed by display terminal 32. A static screen is one wherein the screen image in memory is invariant and serves as a well known "template". What changes in such a screen is the contents of data inserted and extracted from the screen and not the screen configuration itself. For instance, a static screen can be a form, a menu, a standard paragraph or paragraphs, etc.

Dynamic screens memory 22 and 48 in host processor 10 and display terminal 32 respectively hold an identical library of "dynamic" screens recently used by display terminal 32. A dynamic screen is one, any portion of which may be altered at any time during operation of a display terminal. It may be a page of text, numerics, etc. New screen memory 24 holds a copy of a new screen which is to be supplied to display terminal 32, either at the request of display terminal 32, or as a result of a program in host 10 calling for the new screen to be supplied to display terminal 32. In addition, host processor 10 contains an old screen memory 26 which is the screen presently being displayed on display 44 in display terminal 32 and which is contained in the display buffer within terminal 32 (not shown).

As will become apparent, the method of this invention contemplates host processor 10, through the use of a hyper processing sub-routine, performing a plurality of comparisons between a new screen image and images of its stored screens. In addition, other tests are applied to the new screen image to determine if it has been scrolled, is mostly blank or is essentially the same as the old screen. Upon the conclusion of those tests, a delta process is performed on the new screen image and resulting difference data is transmitted to display terminal 32 via communication network 30. Display terminal 32 then accesses from its library of storage screens, that screen image which the host processor has found (if any), is most similar to the new screen image. The display terminal subsequently updates the locally stored screen to incorporate whatever changes are indicated by host processor 10.

The software employed by this invention includes a plurality of parameters important to its execution of the method of the invention. Some of the parameters to be described below will be discussed in substantial detail while others will be mentioned only in passing. Parameters 1-5 are internal work variables and pointers within host processor 10 and are calculated in response to receipt by host processor 10 of various screen parameters from display terminal 32. Parameters 6-15 are factors employed by the host software in the operation of the method; characterize the type and memory sizes within the display terminal and further indicate to the host certain control characteristics.

The parameters are as follows:

1. TBOL—represents to the host processor the total number of bytes of memory space required to hold the images of N dynamic screens. (This factor is calculated by the host when it receives the TBNS parameter from a connected display terminal and multiplies that parameter times the number of bytes per screen.)

2. TBOA—this is the address of a list of addresses of pointers to the first byte of each stored screen.

3. TBDY—this is a pointer to the head bytes of a chain of screens and points to the address of the screen which is the "freshest" and then progresses to the oldest or least used, in order of time of use.

4. TBPS—this is a pointer to the head byte of a private static chain wherein the user may freeze some screens so that they do not disappear (similar to TBDY).

5. TBCS—this is a pointer to a doubly linked list of addresses of saved, static screens. Ordinarily this is a large number of screens which are saved by the host processor and are shared by all users connected to the host, as contrasted to a private set of static screens which may be employed by a single user (e.g., TBPS).

6. TBNS—this is a count of a number of dynamic screens to be saved in the host processor. This information is received from the display terminal which informs the host of the number of dynamic screens the terminal is capable of storing.

7. TBSG—this is the number of bytes in a defined segment size. A segment may be equal to a line of characters on a screen or a portion of a line of characters. For instance, if a line is 80 characters wide, a segment may be 20, 40 or a full 80 characters in size. TBSG is defined at the display terminal site by the user.

8. TBCB—this is the maximum number of blank or null lines on a screen, which if exceeded causes rejection of the screen from any further hyper processing. Thus, if anywhere on the screen there are more than this number of either blank or null lines, the screen is not subjected to further hyper processing but is immediately transferred to a delta process sub-routine. For example, assuming a 24-line screen, TBCB could be set equal to a number between 15 and 18.

9. TBID—this defines the number of segments which, if equal in both old and new screens in both value and relative position, cause the new screen to be rejected from further hyper processing. For instance, if there are 48 total segments in a screen, TBID may be set equal to 36.

10. TBUE—this is the maximum number of unequal segments, determined in a compare operation, which causes a stored dynamic screen to be rejected as being too dissimilar (to the new screen).

11. TBUC—this is a number of characters which if found to be unequal in a comparison of segments, causes a segment to be declared absolutely not equal to a segment of a new screen (e.g., a mismatch of 5 bytes out of 40 bytes).

12. TBLK—this defines a maximum number of screens which the display terminal user can cause to be "locked", so that they will not be dropped from the dynamic screen storage area as other more recently used dynamic screens are inserted into storage.

13. TBMP—the maximum number of private static screens which can be stored by the user, which storage area is reserved from the dynamic screen storage area.

14. TBSD—this is the number of dynamic screens to scan during the scroll screen detection process.

15. TBDL—This is the number of dynamic screens to scan during the line matching process.

Figure 2:
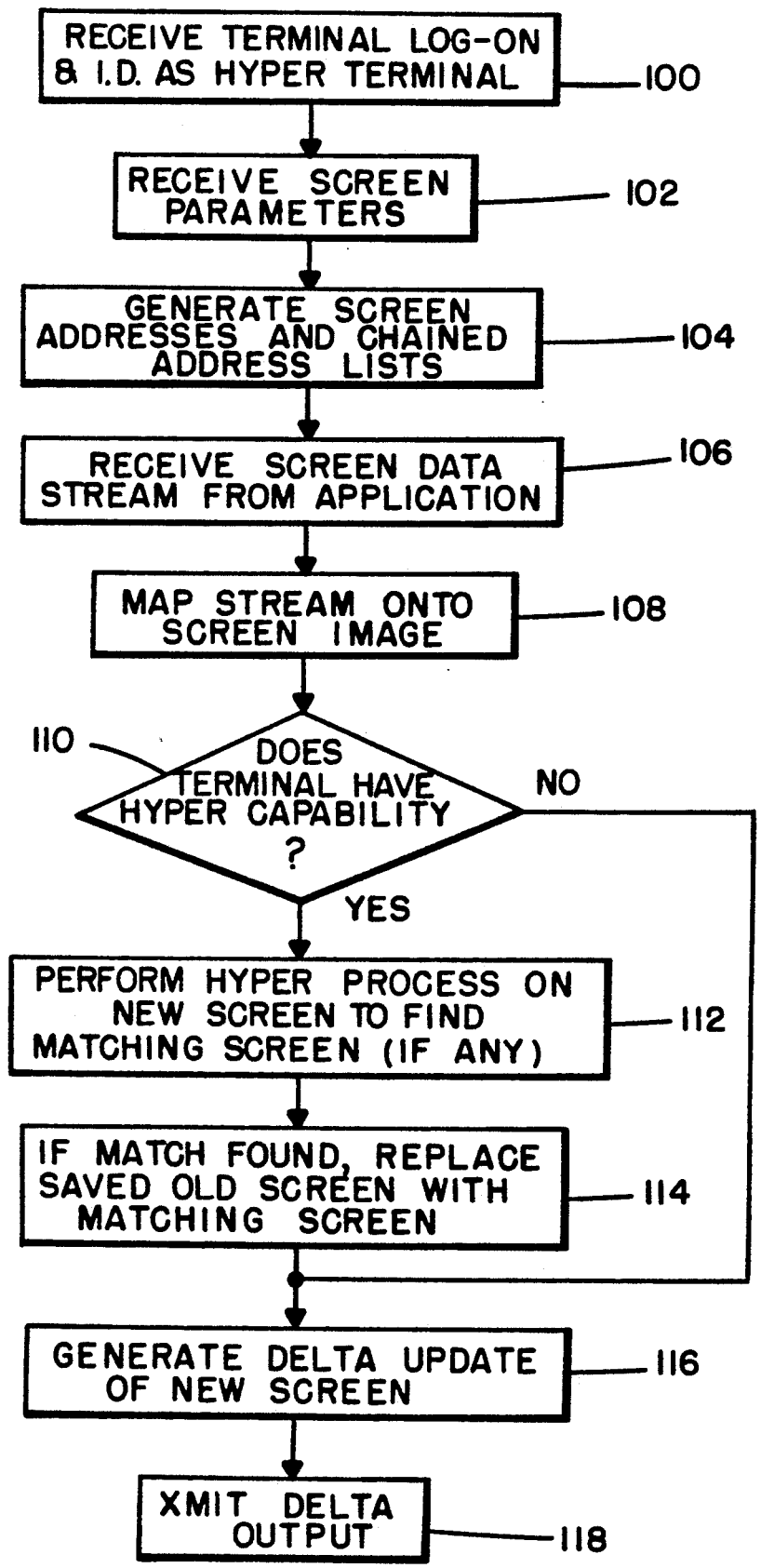
FIG. 2 is a high level flow diagram illustrating the overall operation of the method of the invention.

Turning now to FIG. 2, a high level flow diagram is illustrated which indicates the overall operation of the invention. As shown in box 100, display terminal 32 initially logs on to host processor 10 and provides its identifier as a terminal capable of supporting hyper processing. It then proceeds to transmit to host processor 10 various of its stored parameters, as mentioned above to enable processor 10 to calculate parameters 1-5. Processor 10 then, as shown in box 104 calculates the necessary screen addresses and chained address lists from the supplied parameters. Display terminal 32 then indicates to host processor 10 a request for a specific screen which processor 10 proceeds to provide by obtaining the data screen from its internal application program (box 106). Host processor 10 then maps that screen onto a 24 line × 80 character screen image so that it becomes the "new" screen image. This image or block of data is then subjected to a plurality of tests and comparisons.

Next, host processor 10 determines whether terminal 32 has hyper processing capability. If it does not, the new screen is immediately subjected to delta processing as shown in box 116. This involves the new screen image being compared to the old screen image (screen presently viewable by the user on display 44 (FIG. 1)), and determining, on a character by character basis, the differences between the two screens. Those differences are then transmitted as the delta output (box 118). If however, decision box 110 determines that terminal 32 has hyper processing capability, hyper processing is performed on the new screen to find if there is any "matching" screen stored within host processor 10 (box 112). If a match is found, the saved old screen image in memory 26 is replaced with the found matching screen image (box 114) and the new screen image is subjected to a delta processing comparison with the matching screen found by hyper processing. Thus, in lieu of comparing the new screen image with the old screen image, it is compared with a more closely matching screen image, thereby reducing the difference indications generated by the delta processing (box 116), and resulting in less data transfer to display terminal 32.

In addition to the delta differences transmitted to display terminal 32, the identity of the matching screen is also transmitted. Display terminal 32 is then able to access its copy of the matching screen and to alter that screen in accordance with the delta differences received from host processor 10. Obviously, if no matching screen is found, display terminal 32 merely modifies its old screen image in accordance with the delta differences received from processor 10.

Figure 3:
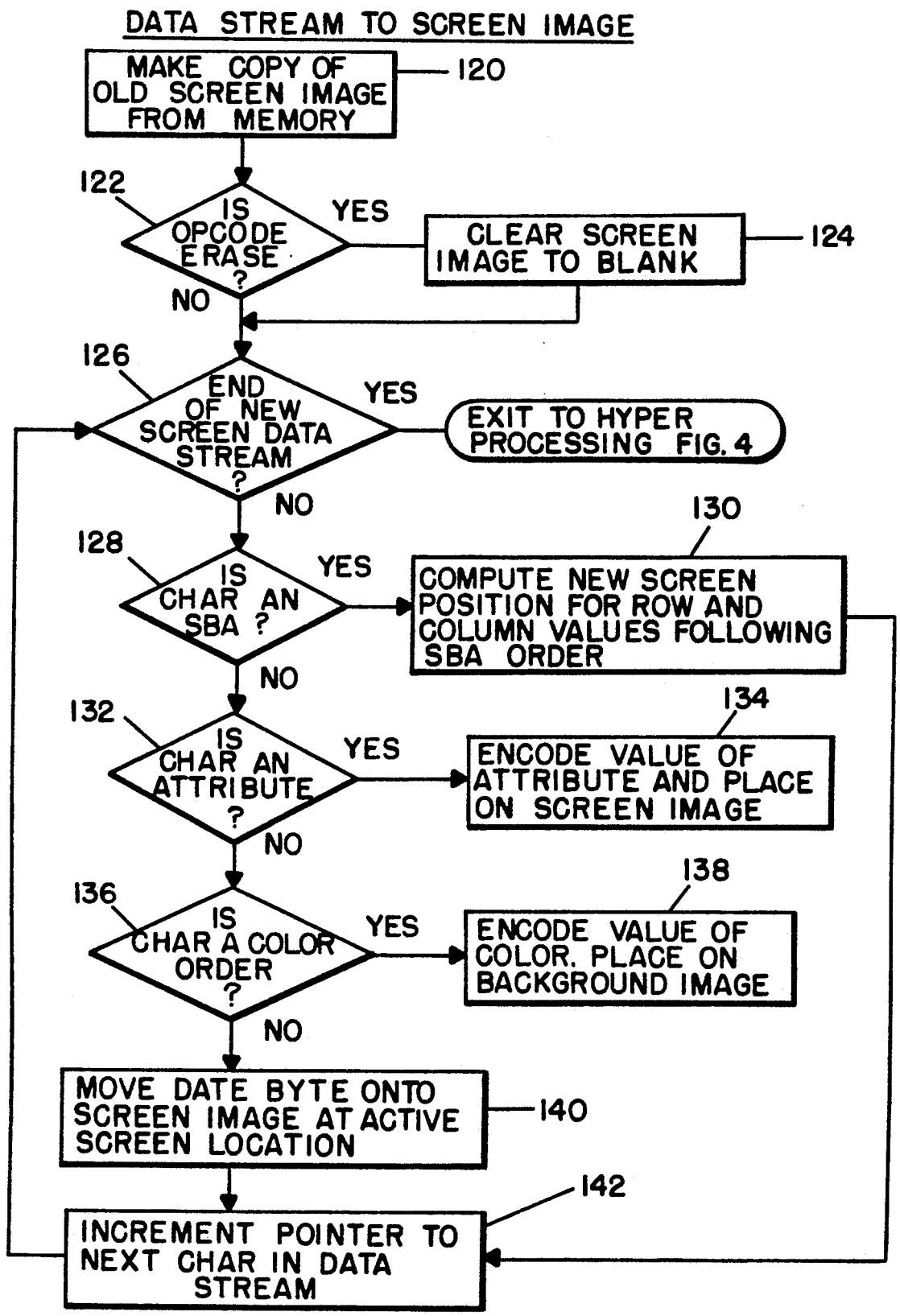
FIG. 3 is a high level flow diagram showing the method for converting a serial data stream to a screen image.

In FIG. 3, additional detail is shown of boxes 106 and 108 of FIG. 2. Initially host processor 10 makes a copy of the old screen image from old screen image memory 26 (box 120). It then determines in decision box 122 whether it has received an erase op-code, in which case it clears the old screen image to blank (box 124). Otherwise, the program proceeds to determine whether all of the new screen data stream has been received and if so, immediately exits to hyper processing. If additional screen data is still to be received, it determines whether a received character is an SBA command—i.e., a command to set the buffer address equal to a specific row and column, and then to place new data there (decision box 128). If the character is found to be an SBA, a new screen position is computed with indicated row and column values, and the pointer is immediately incremented to the next character in the data stream (box 142). If the character is found to be an attribute (decision box 132), the value of the attribute is encoded and placed in the screen image (box 134). If the character is found to be a color order (decision box 136) the value of the order is encoded and it is placed on the background image (box 138). If the character is found to be neither an SBA, an attribute or an order, the data byte is moved into the screen image at the active screen location (box 140) and the pointer is incremented to the next character in the data stream (box 142). This process continues until the end of the new data screen is determined.

In this manner, the screen image is constructed and is ready for further processing. It should be noted, that all of the above action takes place in host processor 10 and is under software control (i.e., a software simulation of the operation of a terminal), whereas in display terminal 32, such actions are generally controlled by firmware. Thus, at the end of this action, host processor 10 has a complete image of the new screen which is to be shown on display 44 in display terminal 32.

Figure 4:
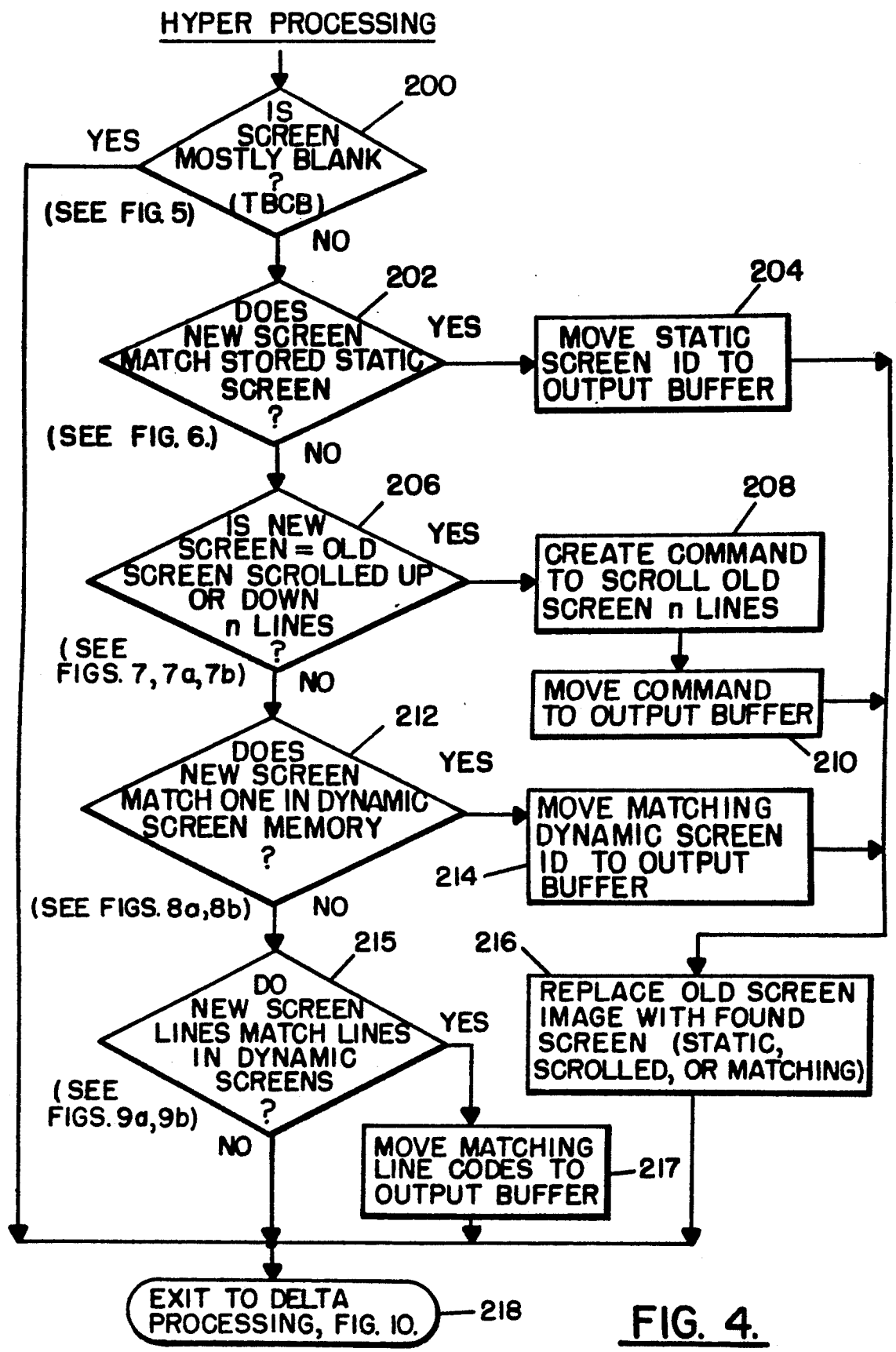
FIG. 4 is a high level flow diagram of the invention (hereafter called hyper processing) and illustrates the pre-processing of a screen's image prior to subjecting the image to delta processing.

Host processor 10 now commences hyper processing of the new screen image. In FIG. 4, the major functions which comprise the hyper processing sub-routines are shown.

Hyper processing commences by determining whether the new screen image is mostly blank (decision box 200). This is accomplished by determining the number of blank lines in the new screen and finding whether that number exceeds parameter TBCB. As soon as the value represented by TBCB is reached, it is immediately known that the screen is mostly blank and the program exits (218) to delta processing. This occurs because for a screen that is largely blank, further hyper processing provides no substantial advantages. Thus, even if hyper processing is able to recall a matching screen for a substantially blank screen, the transmission time savings to display terminal 32 will be so small as to negate the value of subjecting the mostly blank screen to hyper processing sub-routines.

The program continues by determining whether the new screen image matches a stored static screen image (decision box 202). This is accomplished by determining if the new screen has a key, or keys, in a pre-established area of the screen, and whether that key or keys matches a key or keys of a stored static screen in static memory 20 (FIG. 1). A key is a code or series of codes which by its presence identifies a specific screen. If a match of keys is found, a command is created to have display terminal 32 replace its screen image with the matching static screen and that command is placed in the output buffer (box 204), and the image of the matching static screen replaces the old screen image in old screen image memory 26 (box 216).

As above described, a static screen is a one whose format does not change, e.g. a form or other fill-in-the-blanks type of format. Thus, when the replacement static screen is placed in the old screen image memory, and is compared with the new screen in the delta processing sub-routine, the only significant differences to be found will be, e.g., the data inserts in the matching static screen and not the static screen image itself. Thus, the requirements for data transfer are accordingly limited to those differences and includes no data regarding the static screen image itself other than the aforementioned command to recall the matching static screen. Recall that display terminal 32 has an identical library of static screens which it accesses upon receiving appropriate notification from host processor 10.

If the new screen is found not to be a stored static screen, the program proceeds to decision box 206 where the new screen is tested to see if it is the old screen, scrolled either in an upward or downward direction. If scrolling is found, a command is created (box 208) to scroll the old screen by N lines and that command is moved to the output buffer (box 210). Then, the old screen image in old screen image memory 26 is replaced with a version of the old screen which has been scrolled up or down, as previously determined. At this point, the new screen and the scrolled old screen are subjected to delta processing. Here again, the replacement of the old screen image with the scrolled old screen substantially reduces the amount of difference data which is generated and transmitted to display terminal 32.

If the new screen is found not to be a scrolled image of the old screen, then the next action which occurs in the hyper processing sub-routine is shown in decision box 212 and encompasses the comparison of the new screen with each of the screens stored in the host processor's dynamic screens memory 22. As will be seen in the description of the dynamic screen comparison routine, this test involves a number of comparisons which enable host processor 10 to determine whether the new screen equals or exceeds a predetermined level of similarity with one of the stored dynamic screens. If such similarity is found, a command is created to have display terminal 32 recall the matching dynamic screen. Such command contains the matching dynamic screen identifier which is moved to the output buffer (box 214) and the matching dynamic screen itself replaces the old screen image in old screen image memory 26. The found matching dynamic screen is then compared with the new screen in the delta processing sub-routine and the found differences are transmitted to display terminal 32, along with the aforementioned dynamic screen recall command.

If the new screen is found not to "match" previously stored dynamic screens, then the next action involves a comparison of each new screen line with lines in a number (TBDL) of previously stored dynamic screens (box 215). For each line match found, a coded triplet is produced designating the dynamic screen in which the matching line was found, the number of the matching line in that screen, and the number of the line in the new screen for which the comparison was made. This triplet is than passed to the output buffer (box 217) and the comparisons continue until TBDL screens have been compared with each line of the new screen. At such time, the program continues to delta processing where non-matching lines are subjected the the delta processing routine.

Figure 5:
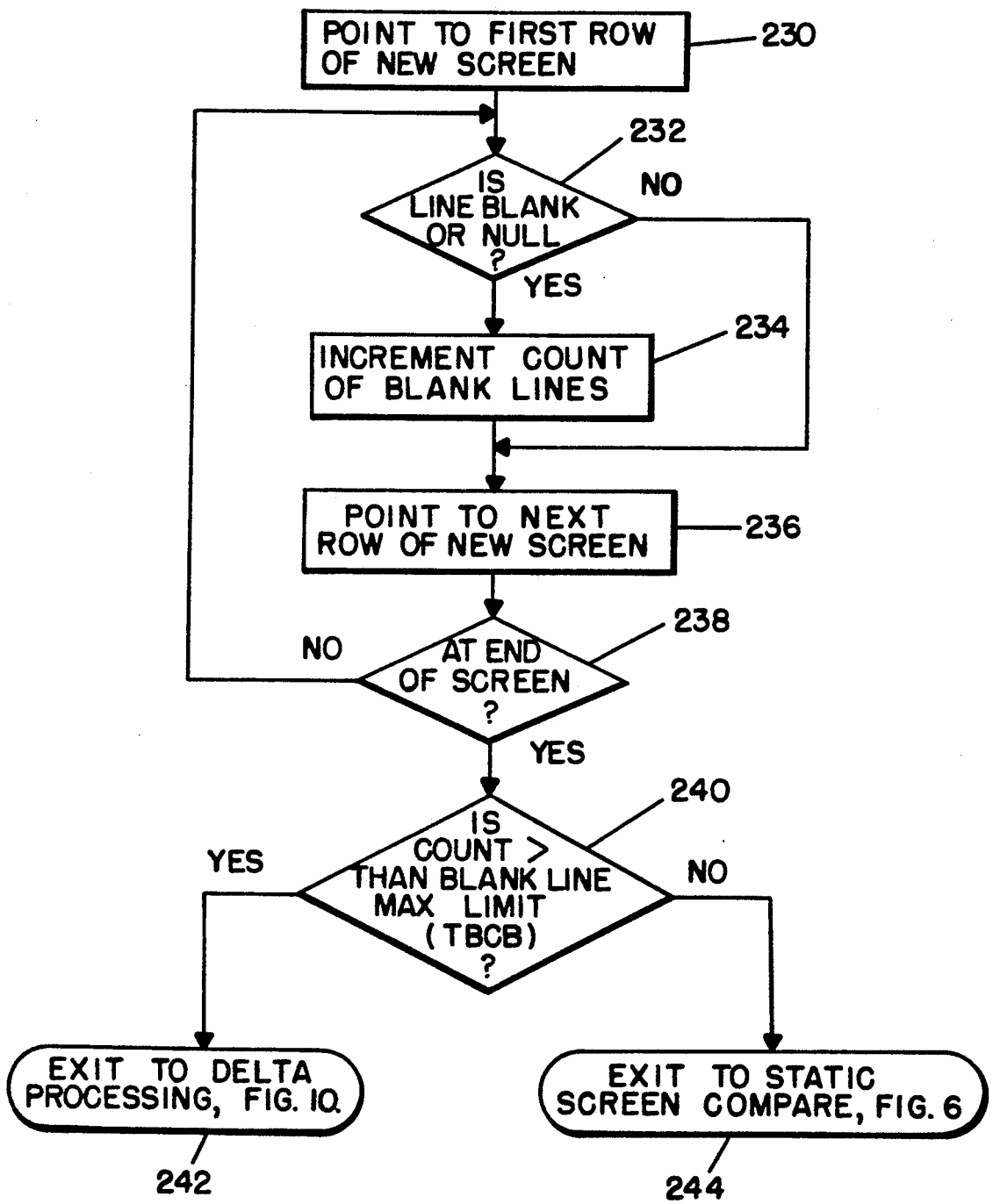
FIG. 5 illustrates the "mostly blank screen" test portion of hyper processing.

Turning now to FIG. 5 et seq., the detailed operation of the sub-routines shown in FIG. 4 will be described. The first step of the mostly blank screen test causes a pointer to be set to the first row of the new screen (box 230). The screen line is then examined and a determination made whether it is either all blank or all nulls (i.e., all "zeros") (decision box 232). If the screen line is found to be all blank or nulls, a count of blank lines is incremented by one (box 234) and the pointer is incremented to the next line (box 236). If a line is found not to be blank or null, box 234 is omitted and the pointer immediately is moved to the next line of the new screen. Then, if not at the end of the new screen (decision box 238), the blank or null determination is repeated until the program arrives at the end of the screen, at which point the count of the blank lines is compared to the blank line maximum limit (TBCB) in decision box 240. If TBCB is equaled, the program immediately exits (exit 242) to delta processing as shown in FIG. 9. If the count is found to be less than TBCB, indicating a non-blank screen, the program exits to the next stage of hyper processing (exit 244) to static screen compare shown in FIG. 6.

Figure 6:
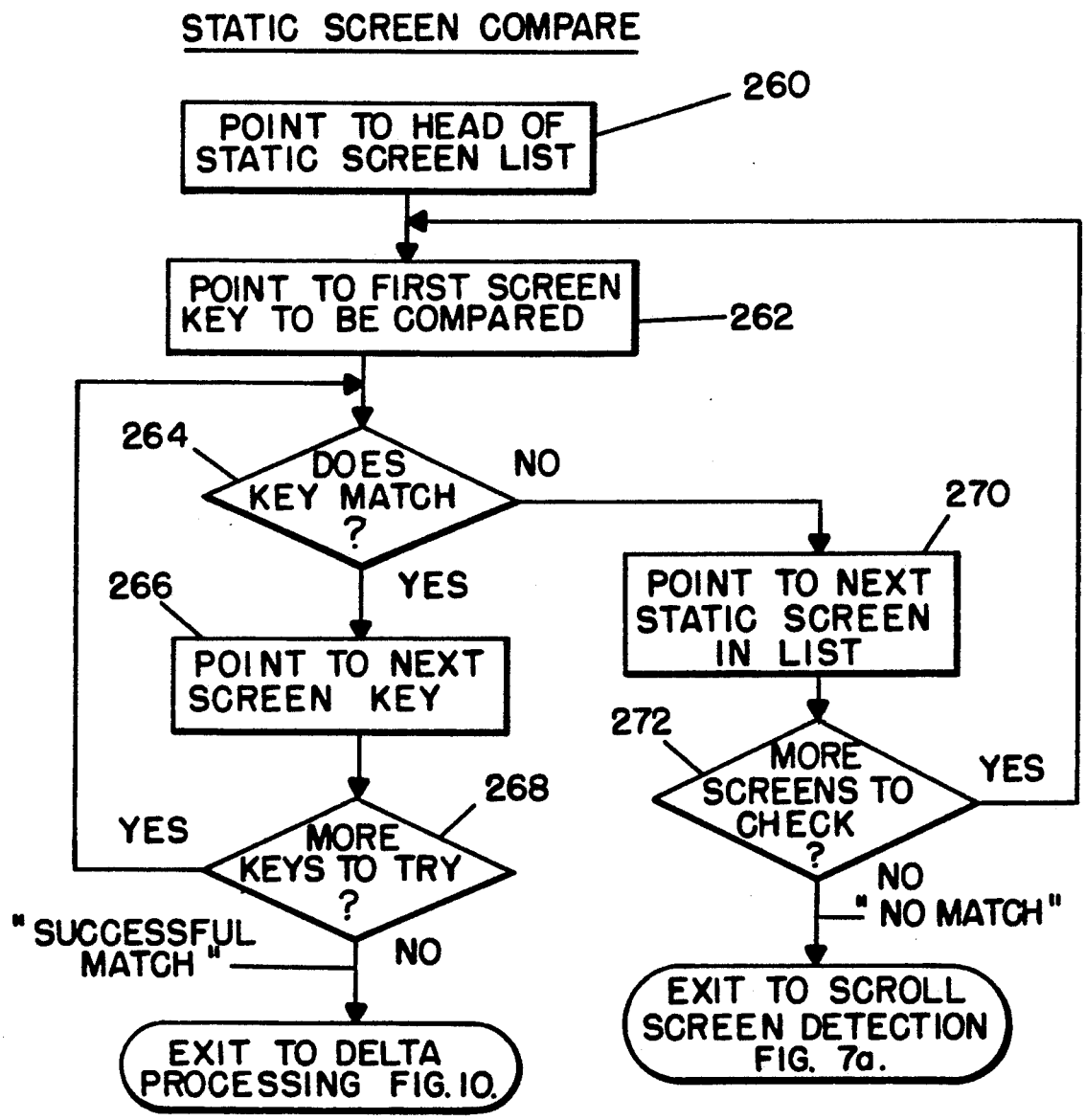
FIG. 6 illustrates a flow diagram of the "static screen compare" portion of hyper processing.

Turning to FIG. 6, the static screen compare subroutine is initiated by setting a pointer to the head of the static screen list of static screens stored in host processor 10 (box 260). Then, a pointer is set to the first screen key (if any) to be compared (box 262) and, as indicated in decision box 264, the static screen key is compared with the new screen key to determine if a match is present. If a match is found, the program increments the pointer to the next screen key in the static screen being examined (assuming there is more than one key associated with the static screen). It should be here noted that static screens will often have more than one key so that classes of static screens and sub-classes of individual static screens within each class can be classified and accessed. Thus, the fact that an initial key is found to match does not necessarily indicate that a match of screens has been found. All keys that are resident in a static screen must be found to match before a match is absolutely determined. Thus, if more keys to try are indicated (decision box 268), the program recycles until all keys have been tested.

Figure 7:
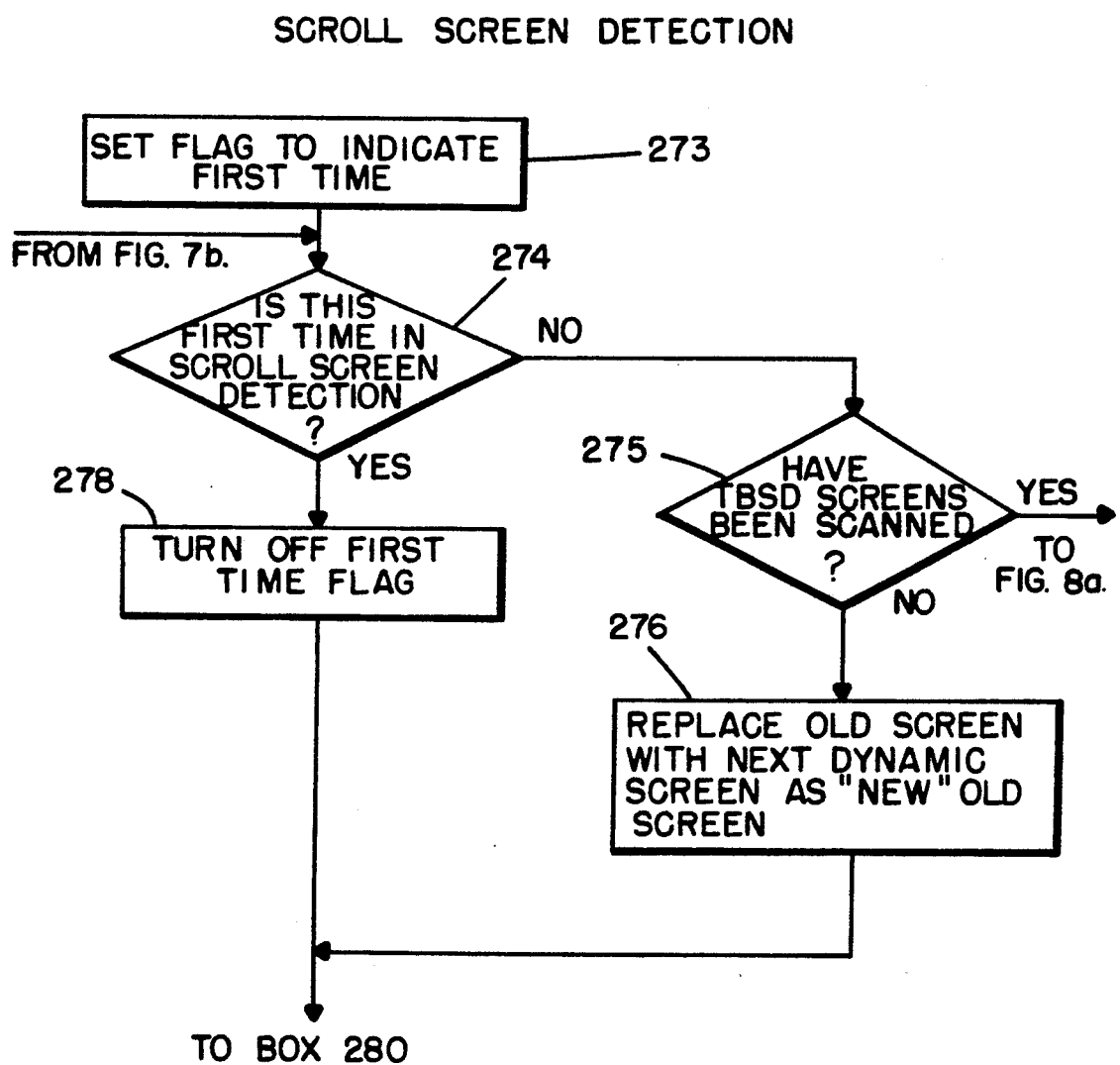
FIGS. 7, 7a and 7b illustrate the "scroll screen detection" process portion of hyper processing.

If no further keys are left to try, then a "successful match is found" and the program exits to delta processing in FIG. 9. On the other hand, if a key is found at any point in the process not to match, then the next static screen is accessed (box 270), a determination being then made whether there are additional static screens to check, and, if so, the program recycles back to box 262. Finally when no further static screens remain to be checked, the program indicates a "no match" and exits to the scroll screen detection sub-routine shown in FIGS. 7, 7a and 7b.

The objective of the scroll screen detection sub-routine is to determine whether the new screen is a scrolled version of the old screen within old screen image memory 26 (FIG. 1).

The subroutine starts (FIG. 7) by setting a flag to indicate "first time" for scroll screen detection (box 273). Then, in decision box 274, the system inquires whether the scroll screen subroutine has been run before for the new screen. This procedure occurs because it may occur during a scroll screen routine that the program producing screen images is interrupted by a system communication which causes production of another screen or screens. This causes the screens, against which the scrolling comparison is being made, to be pushed down in the screen queue. Thus, when the scroll screen detection sub-routine restarts, it is important to know if the process was previously in process so that, in addition to the most recent screens, how many additional screens in the screen queue (up to TBSD screens) should be included in the sub-routine.

Figure 7A:
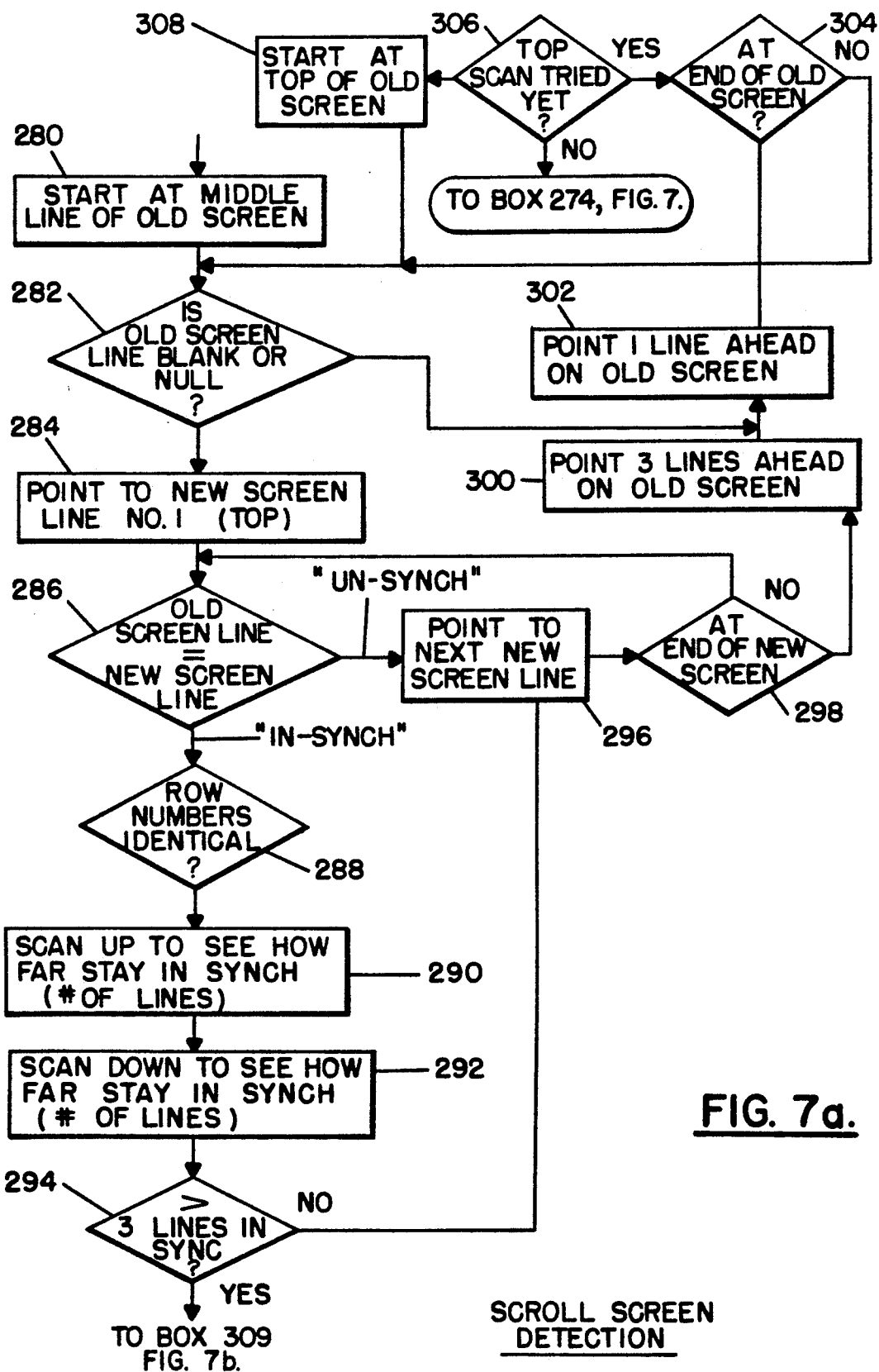

The above is accomplished in response to a no from decision box 274, by determining whether TBSD screens have been scanned. If yes, the program proceeds to the dynamic screen compare in FIG. 8a. If no, the old screen is replaced with a used dynamic screen (box 276), and the scroll screen subroutine continues as shown. Similarly, if it is determined in box 274 that this is the first time the new screen is being subjected to the scroll screen detection subroutine, the first time flag is turned off (box 278), and the subroutine continues as shown in FIG. 7a.

The scroll screen detection sub-routine continues (box 280) at the middle line of the old screen. The middle line is chosen as a commencement point (rather than the top line) as it has been found to reduce the time necessary to make the scroll determination. The first determination (decision box 282) is whether the old line is all blank or null. If the answer is yes, the middle line pointer to the old screen is incremented to the next line, and the "blank" test is re-executed. If the answer is no, a pointer is set equal to the first line of the new screen (box 284) and the equality is tested of the middle line of the old screen and the first line of the new screen (decision box 286). If the lines are found equal, then it is said that the new screens are, for the time being, "in synch".

In other words, what has been determined is that, e.g. it appears that the old screen has been scrolled upwardly so that its middle row is now the top row of the new screen. Nevertheless, even though the two lines are found to be equal, a scroll condition may still not exist. It is then determined whether the line numbers are identical (decision box 288) and if they are found not to be identical, the sub-routine scans upwardly through lesser row numbers to determine how far the "in synch" condition remains (box 290). The program also scans down through increasing line numbers to see how far the "in synch" condition remains (box 292). If greater than three lines remain "in synch" in either direction, (decision box 294) then a scroll condition is declared to exist.

Figure 7B:
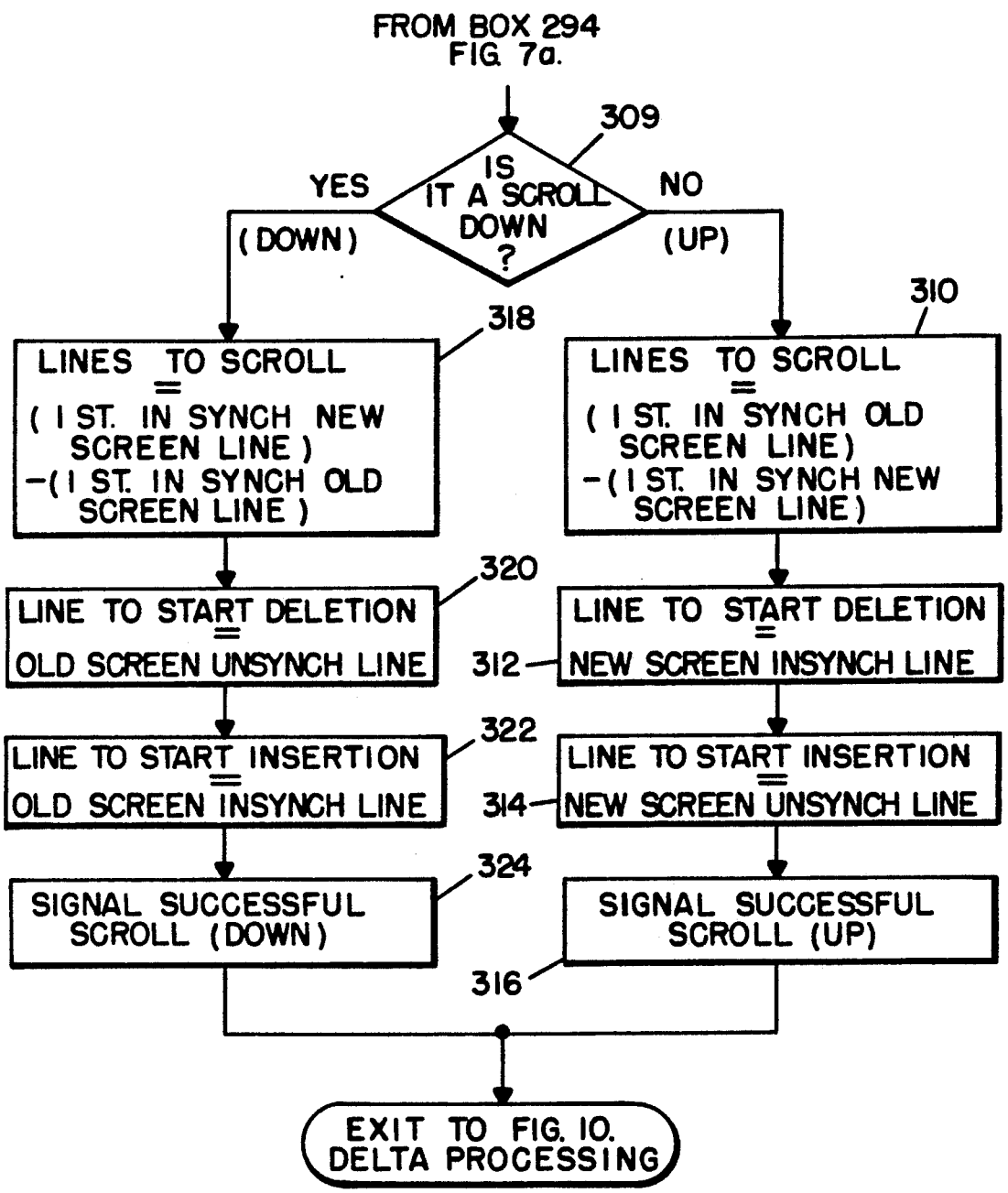

Before preceding to FIG. 7b and a description of how detailed scroll determinations are made, if decision box 286 finds that the old line is not equal to the new line, an "un-synch" condition results and the pointer is incremented to the next new screen line. If the routine is not at the end of the new screen (decision box 298), the old line/new line comparison in decision box 286 is repeatedly carried out until either an "in-synch" condition is found or all comparisons indicate no synch.

At this point in the routine, the middle line of the old screen has been compared with all lines of the new screen. The pointer is next incremented four lines ahead on the old screen (boxes 300 & 302); a determination made whether the sub-routine is at the end of the old screen (decision box 304); and the comparison process again repeated, between the old screen line and all of the new screen lines.

Once the last line of the old screen is reached (decision box 304), the top-scan portion of the sub-routine is commenced (decision box 306). In this case, as shown in box 308, the top line of the old screen is then compared with each of the lines of the new screen and the process repeated. Assuming that no comparison results where more than three lines are "in synch", then it is determined that a scroll has not occurred and the sub routine recycles back to decision box 274 in FIG. 7. The greater than three line comparison limit is included to assure that a possible match of one or two lines from a pair of screens do not result in a scroll indication, when in fact, the screens have not been scrolled but rather there is just an incidental match of lines.

Turning to FIG. 7b, an initial determination is made in decision box 309 as to whether a scroll up or a scroll down has been determined. In either case, the following routines are similar. Assuming that a scroll up is found, a count is made as to how many lines the new screen should be scrolled to equal the old screen. This is determined by subtracting the line number of the first in-synch line of the old screen, from the line number of the in-synch line of the new screen. Then, in box 312, the line to start deletion of the old data is determined as equal to the 1st in-synch new screen line. The line to start data insertion is determined as (box 314) the new screen line which is the first unsynch line. A successful scroll is then signaled and the sub-routine exits to the delta processing sub-routine of FIG. 10. The process for a scroll down determination is similar and may be determined from an inspection of boxes 318, 320, 322, and 324.

Figure 8A:
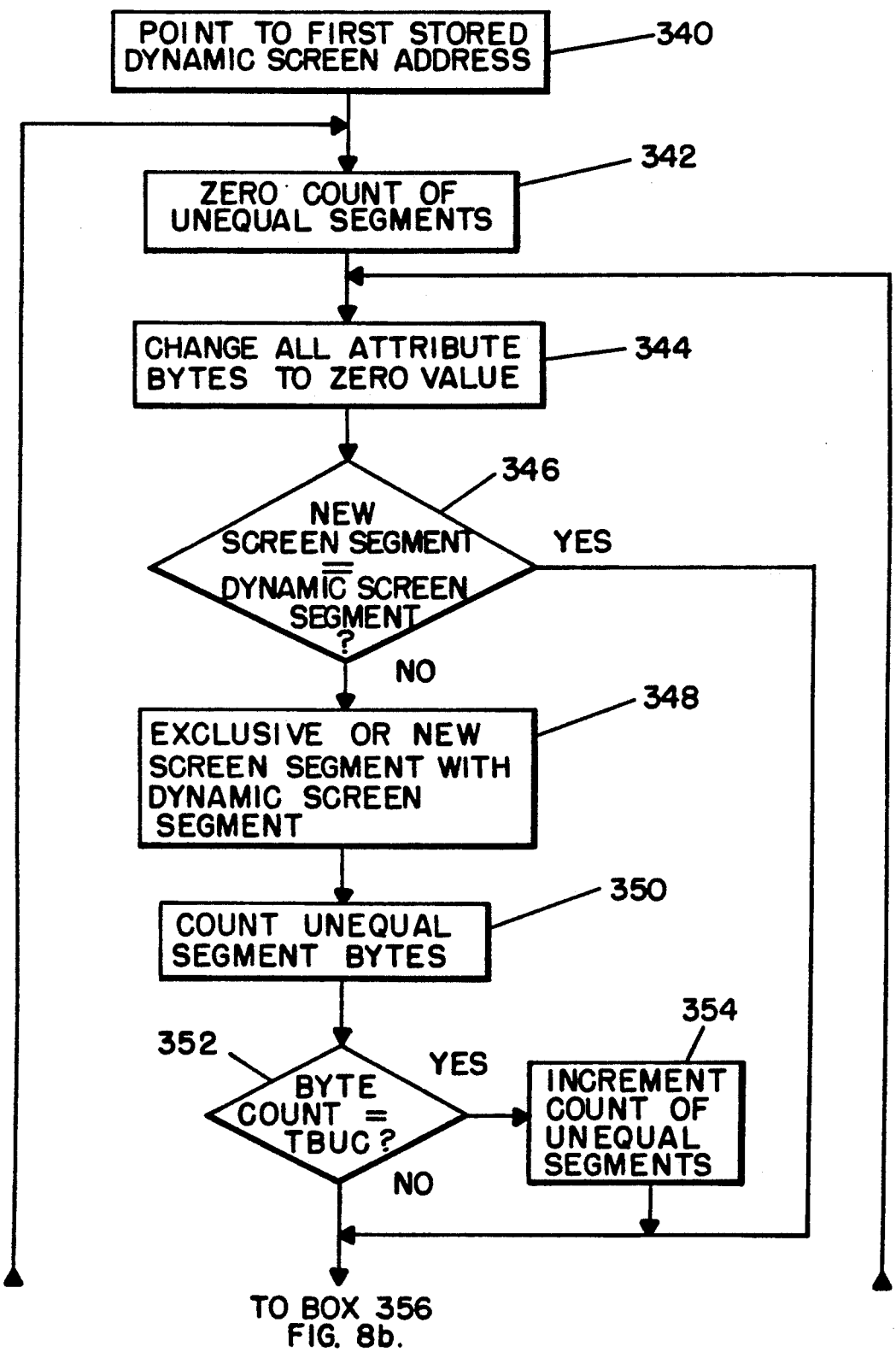
FIGS. 8a and 8b illustrate the "dynamic screen compare" portion of hyper processing.

If at this stage, the new screen has been determined not to be mostly blank; not to match a stored static screen; and not to be a scrolled screen, either up or down, a determination is made whether the new screen matches one of the dynamic screens stored in dynamic screens memory 22 of host processor 10. The concept of "match" in this instance is not an identity match, but an "almost" match. In other words, levels of similarity are determined with a most similar dynamic screen, assuming it meets certain criteria, being chosen as the best match. The dynamic screen compare sub-routine starts, as shown in FIG. 8a, by a pointer being set to the first stored dynamic screen address (box 340) to indicate the first dynamic screen stored in dynamic screen memory 22. The count of unequal segments in a dynamic screen compare register (not shown) is set to 0 (box 342) as an initialization step. A further initialization step occurs in box 344 where the two segments to be tested are copied to temporary work areas, and all attribute bytes are set to zero value. Then, the first new screen segment is compared to the first dynamic screen segment. If there is an inequality found, it must then be determined what is the level of inequality. This is accomplished by exclusive OR'ing each byte of the new screen segment with the corresponding byte in the dynamic screen segment (box 348). A comparison is made sequentially for each byte, with each non-zero (unequal) byte counted (box 350), and the cumulative count compared to previously inserted parameter TBUC (number of unequal bytes in a segment which absolutely classifies the segment as not equal). If the count reaches TBUC, the segments are assumed to be unequal and the count of unequal segments is incremented (box 354) and the sub-routine continues. Thus, the count of unequal segment bytes is stopped as soon as the TBUC parameter is reached and no further byte comparisons occur within that particular segment. If, as shown in decision box 346, a new screen segment is found to be equal to a dynamic screen segment, then the aforestated portion of the sub-routine is entirely by-passed.

Figure 8B:
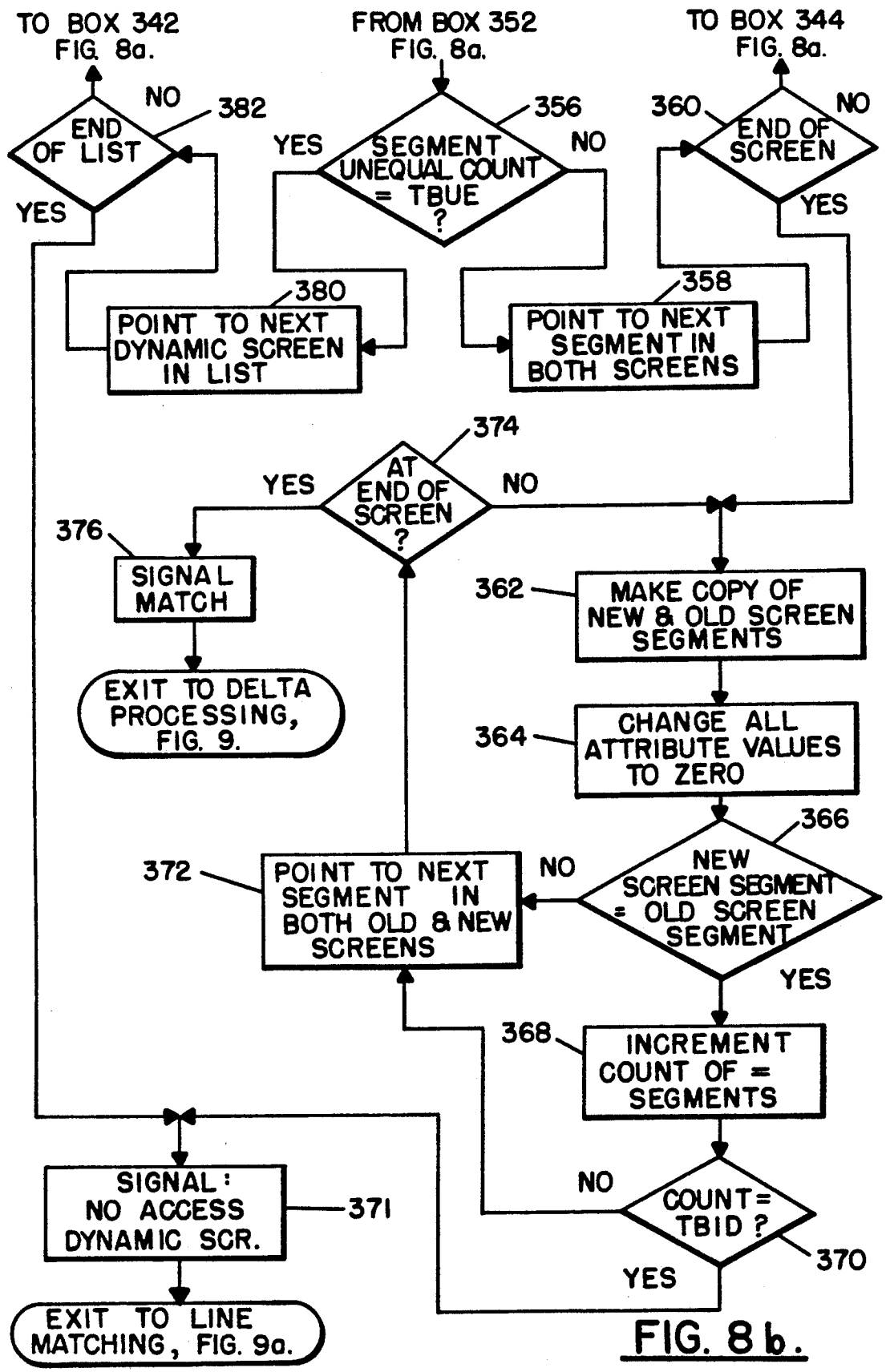

If, as shown at decision box 352, the unequal byte count does not reach the TBUC parameter, then the segments under comparison are assumed to be "similar". The sub-routine then proceeds to decision box 356 in FIG. 8b where a determination is made as to whether the segment unequal count is greater than the TBUE parameter. It will be recalled that the TBUE parameter is the maximum number of unequal segments which causes a screen to be released from further comparison. For instance, if the unequal segment count is set, per TBUE, to equal 16 segments, as soon as the count is equal to 16, the screen is declared dissimilar and the program proceeds to choose for comparison, the next dynamic screen in the list (box 380).

Following this path of the sub-routine, a determination is then made as to whether the end of the list of dynamic screens has been reached and if not, the program recycles back to box 342 in FIG. 8a and continues. On the other hand, if the end of the list of stored dynamic screens is reached, then a "no match" is signaled (box 371), and the program exits to delta processing sub-routine (FIG. 9).

Assuming, as shown in decision box 356, that the segment count still has not exceeded the TBUE parameter, the next segment is tested as aforestated (boxes 358 and 360). Assuming the end of the screen has been reached and all segments compared, with the TBUE parameter not being reached, then a yes indication emanates from decision box 360. The process is not finished yet, however, as it is desirable to know if the new screen is actually nearly identical to the old screen. At this point, a copy is made of the new and old screen segments in the temporary work area (box 362); all attribute values are changed to zero (box 364) and each new screen segment is compared to each old screen segment (decision box 366). This procedure continues with a count being incremented of all equal segments found (box 368). If the count of equal segments is found to equal the TBID parameter, then a "no access dynamic screen" indication is provided via box 371.

It will be recalled that the TBID parameter defines the number of segments which must be found equal before new and old screens can be determined to be "very similar". For instance, if there are 48 total segments in a screen, once the equal segment count equals 36 segments, a "very similar" indication is issued. The reason for making this determination is that some 40 bytes of data are required to be issued to display terminal 32 to properly indicate to the terminal which dynamic screen is to be accessed. If during dynamic screen compare, the new screen is found to be "very similar" to the old screen, it is more efficient, from a data transmission point of view, to avoid the necessity of generating a dynamic screen recall command. Thus, in such a case, the only data transmitted are the screen differences found from a delta comparison of the old screen with the new screen.

Figure 9A:
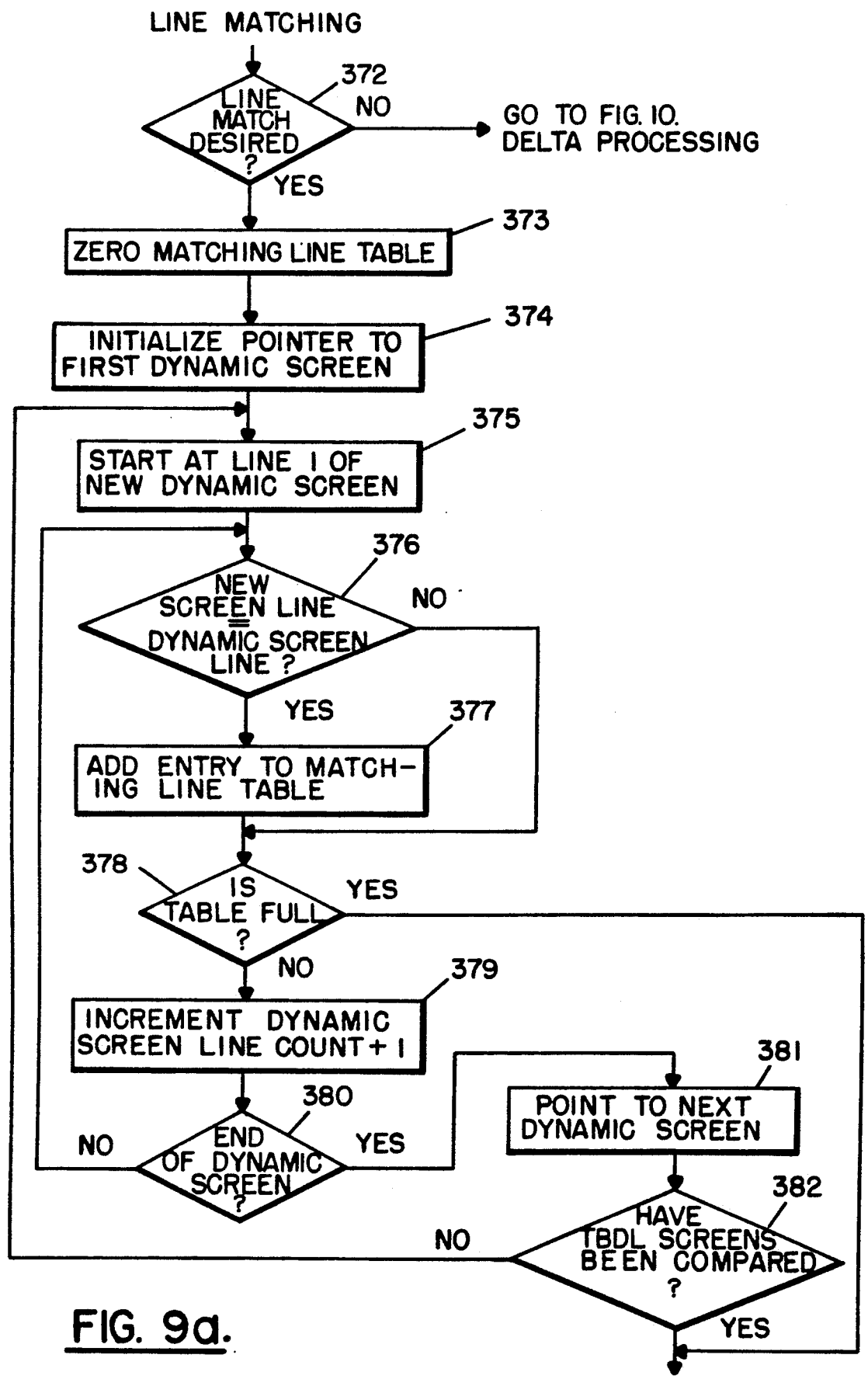
FIGS. 9a and 9b illustrate the "line matching" portion of hyper processing.
Figure 9B:
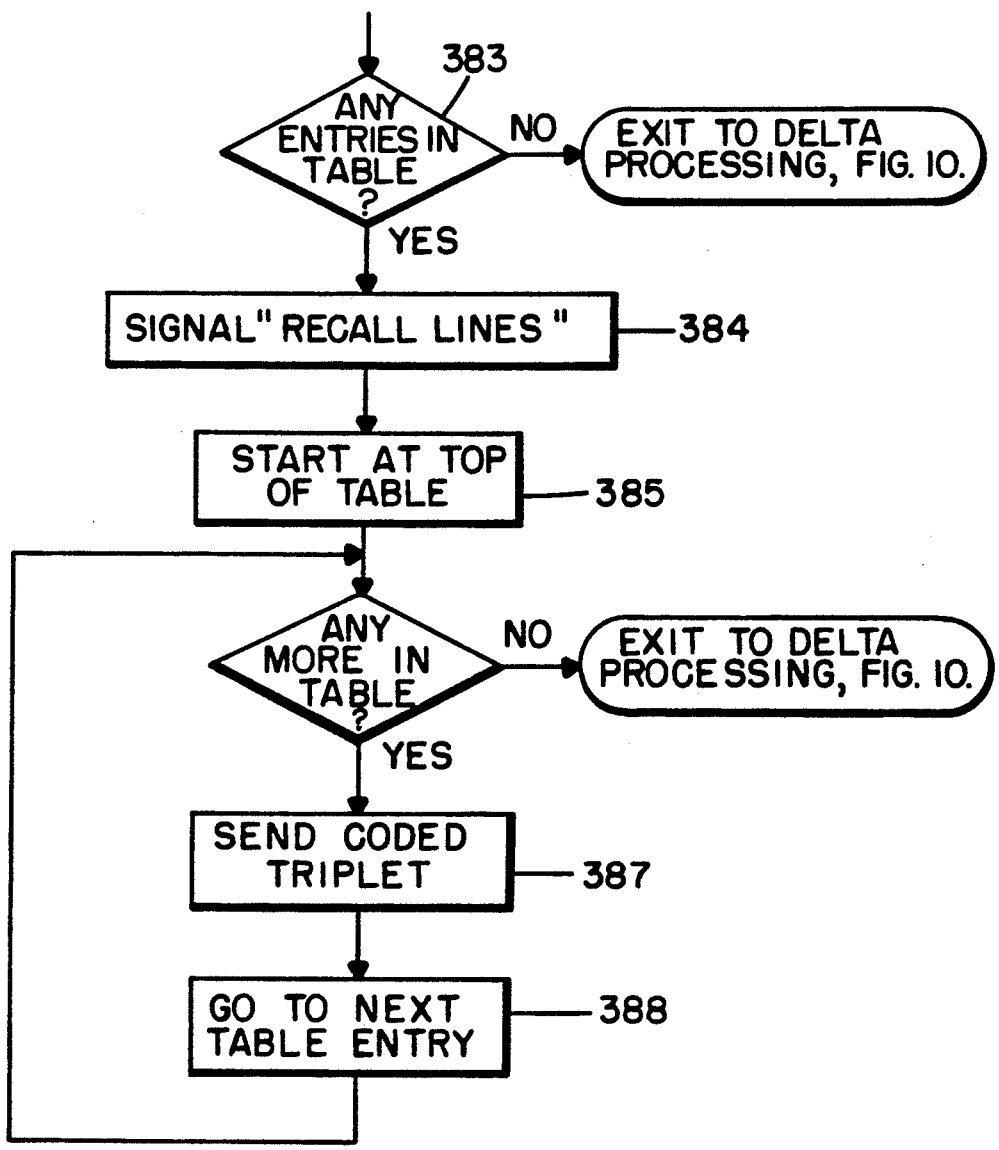

Obviously, if none of the aforementioned parameters are equalled i.e., TBUC, TBUE, or TBID, then decision box 374 creates a yes indication which causes a signal "match" to be generated (box 376), at which point the sub-routine exits to the line matching sub routine shown in FIGS. 9a and 9b.

The line matching subroutine accomplishes a comparison of each line of the new screen against lines in a plurality (BDL) of most recently used dynamic screens. A default value for TBDL may be one-half of TBNS, that is, one-half the number of dynamic screens. The user, of course, may insert any other chosen value for TBDL. While this subroutine requires a substantial number of comparisons to occur, the tremendous speed of processors today makes the approach viable. A successful match from this subroutine differs from the three previously described subroutines in that full screens do not have to "match", only one or more lines on any screen.

Figure 10:
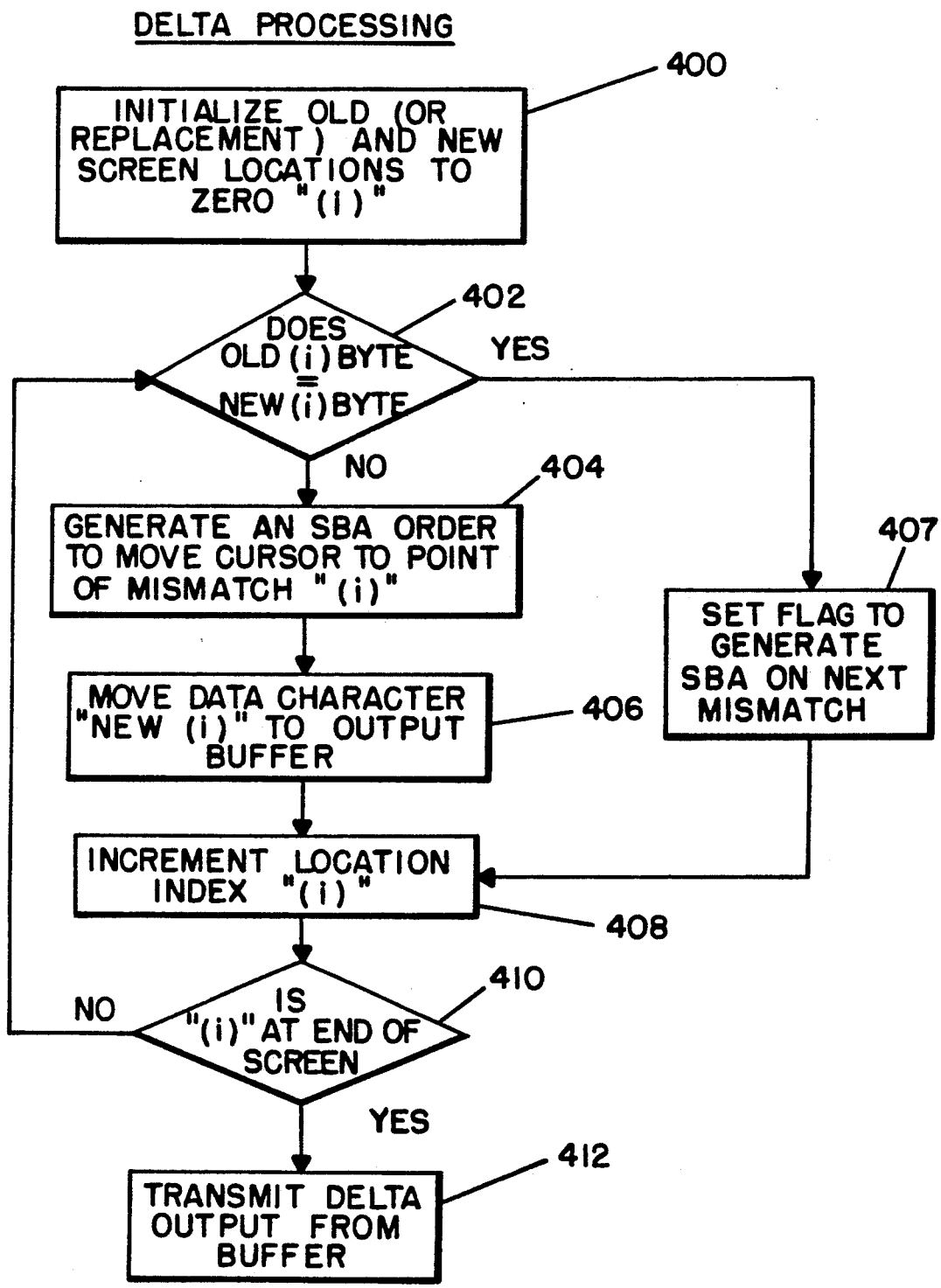
FIG. 10 is a flow diagram of the "delta" processing portion of the invention.

The procedure commences by determining whether the line matching subroutine is turned on (e.g. "desired") and if not, the program proceeds to FIG. 10, delta processing (see decision box 372). If line matching is turned on, a matching line table is zeroed (box 373) and a pointer is initialized to indicate a first dynamic screen whose lines are to be compared with lines on the new screen. The program then starts with line 1 of the new screen (box 375) and compares it against a line on the first screen (decision box 376). If the lines are found to be equal, then an entry is added to the matching line table indicating the number of the new screen and the number of the matching screen line and the number of the matching screen (box 377). The subroutine then proceeds to determine whether the matching line table is full (decision box 378) and if not, the dynamic screen line count is incremented by one (box 379) and it is determined whether the end of that screen has been reached (decision box 380). If no, the procedure continues with the comparison process. If yes, the next dynamic screen is selected (box 381) and it is determined whether TBDL screens have been compared (decision box 382) and if not, the program recycles to box 375 where the comparison continues.

If all TBDL dynamic screens have been compared against the new screen or the matching line table is full, the procedure continues, as shown in FIG. 9b, by determining whether there are any entries in the matching table (decision box 383). If not, the program exits indicating no matching lines found. If yes, a signal "recall lines" is generated (box 384) and the program continues by starting at the top of the table and accessing each set of matching line numbers and screen identifiers (boxes 385, 386). It constructs for each set of matching lines a coded triplet indicating the number of the dynamic screen in which the matching line was found, the number of the line in that screen, and the number of the line in the new screen with which it was found to match (box 387). The process repeats by going to the next table entry and recycling back to decision box 386. When no more entries are found in the table, the program exits to delta processing, FIG. 10.

The delta processing sub-routine is shown in FIG. 10. It will be recalled from a review of FIG. 4, that the delta processing sub-routine is presented with either (a) a new screen image which has been found to be mostly blank; or (b) a new screen image which has been found to be "very similar" to a stored dynamic screen image; or (c) a static screen image which has been found to match the new screen, which static screen has been accessed from the static screen memory; or (d) a scrolled version of the old screen; or (e) a matching dynamic screen accessed from dynamic screen memory 22. Thus, the delta process sub-routine operates upon the most similar screen found in relation to the new screen and not just, as in the prior art, with respect to the old screen.

As shown in FIG. 10, the delta processing sub-routine commences by initializing the old (or replacement) screen image and new screen image locations to zero (the i'th positions) so that they are coincident (box 400). Then, each old or replacement screen byte is compared with each new screen byte (decision box 402) to determine inequality or equality. If an inequality is found, as SBA order is generated to move the cursor to the point of mismatch (box 404) and the new screen image data character, determined to be a mismatch, is moved to the output buffer (box 406). The screen location is then indexed to the next i'th position (box 408), a determination made as to whether the process is at the end of the screen (decision box 410) and if not, the comparison process repeats.

If, in decision box 402 an equality is found to exist between the old or replacement screen byte and the new screen byte, a flag is set to generate an SBA cursor control command on the next mismatch and the location is then incremented to the next byte (boxes 407, 408).

Once the delta processing sub-routine is completed, all generated delta outputs (i.e., different characters) are then transmitted from the output buffer of host processor 10 to display terminal 32. If, as aforestated, either a static screen or a dynamic screen was found to match the new screen and was the screen against which the delta processing sub-routine was performed, an additional indicator of the specific matching screen is sent along with the delta output. On receipt of those signals, terminal 32 accesses the indicated screen and modifies it in accordance with the received delta commands.

It should be understood that the foregoing descriptions are only illustrative of the invention. There is alternatives and modifications can be devised by those skilled in the arts without departing from the invention. Accordingly, the present invention is intended to embrace all such alternatives, modifications and variances which fall within the scope of the appended claims.

What is claimed is:

1. An efficient method for transfer of information over a communication link between first and second processors, said processors employing blocks of data on a repetitive basis, each said processor including storage means for storing copies of used blocks of data, a block of data currently used in said second processor termed an old data block and a block of data to be transmitted from said first processor to said second processor termed a new data block, the method comprising:

(a) storing identical copies of used data blocks and said old data block in said storage means of said first and second processors;

(b) comparing in said first processor, said new data block to said stored copies of said used data blocks and said old data block to determine if said new data block exhibits a preestablished level of similarity with any said stored data block copy, and selecting from among said copies of stored data blocks, a data block which exhibits said preestablished level of similarity; and (c) transmitting to said second processor, information regarding the difference between said new data block and said selected stored data block, and the identity of said selected stored data block.

2. The method as defined in claim 1 further including:
(d) if no stored, used data block exhibits said preestablished level of similarity with said new block, transmitting to said second processor information regarding the difference between said new data block and said old data block.

3. The method as defined in claim 2 wherein said second processor executes steps comprising:
(e) receiving the information transmitted by said first processor in step (c);
(f) retrieving said stored data block identified by said information; and
(g) altering said retrieved, stored data block in accordance with difference information included in said received information.

4. The method as defined in claim 3 wherein said second processor executes steps comprising:
(h) receiving the information transmitted by said first processor in step (d); and
(i) altering said old data block in accordance with difference information included in said received information.

5. The method as defined in claim 4 wherein each said data block is organized as a screen of data to be shown on a display terminal, said first processor is a host computer and said second processor is a display terminal.

6. The method as defined in claim 5 wherein said display terminal transfers parameters to said first processor which define comparison limits that aid said first processor in determining similarity between stored screens of data and a new screen of data.

7. The method as defined in claim 1, further comprising the steps of:
(j) determining if said new data block comprises mostly blank or null data, and if so,
(k) eliminating step (b) and transmitting information to said second processor regarding differences between said old data block and said new data block.

8. The method as defined in claim 1 further comprising the steps of:
(l) determining if said new data block is a scrolled version of a stored data block, and if so found;
(m) transmitting to said second processor information as to a number of lines to scroll the copy of said determined stored data block in said second processor, and the differences between said new data block and said determined stored data block, after scrolling.

9. The method as defined in claim 1 wherein step (b) includes the further step of:
(n) determining if said new data block has an identifier which matches an identifier of a stored data block in said first processor and if such a match is found, causing step (c) to transmit information regarding the differences between said data block with the matching identifier and said new data block.

10. The method as defined in claim 9 wherein said second processor, responds to said transmitted information in step (n) by retrieving its copy of said data block with the matching identifier and modifying it in accordance with said difference information.

11. The method as defined in claim 1 wherein said step (b) further comprises the step of:
(o) cumulatively matching data segments of said new data block with data segments of a stored data block, said new data block being determined as non-matched with said stored data block when a preset count of non-matching data segments is reached, said preset count of data segments being less than a total number of data segments in said stored data block.

12. The method as defined in claim 11 wherein said step (o) further comprises the steps of:
(p) cumulatively counting matching data characters of each segment of said new data block and said stored data block; and
(q) classifying a data segment of said stored data block as non-matching when a predetermined count of non-matching data characters is reached, said number being less than a total number of data characters in a data segment.

13. The method as defined in claim 12 further comprising the steps of:
(r) accumulating a count of matching data segments when said data segments of said new data block are compared with said data segments of said old data block and declaring a match when said count equals a predetermined number, said number less than a total number of data segments in a data block;
(s) terminating any further matching upon the occurrence of said count; and
(t) transmitting to said second processor information regarding the difference between said old and new data blocks.

14. The method as defined in claim 1, wherein said comparing step (b) comprises the steps of:
b1. comparing lines of data in said new data block with lines of data in a plurality of stored data blocks to determine an identity therebetween; and
b2. producing coded signals which indicate each line of data in said new data block which is identical to a line of data in a stored data block, and further indicate identifiers for identical lines in said stored data blocks and identifiers for said stored data blocks.

15. The method as defined in claim 14 wherein said transmitting step (c) comprises the further step of:
c1. transmitting, for every identical line of data found in a stored data block, a coded signal to said second processor, whereby said second processor accesses said identical lines from its stored data block.

16. A method for transfer of information between first and second processors, said processors employing screens of data, each said processor including storage means for storing copies of used screens, a screen currently used in said second processor termed an old screen and a screen to be transmitted from said first processor to said second processor termed a new screen, the method comprising:
(a) storing copies of used screens and said old screen in said storage means of said first and second processors;
(b) comprising in said first processor, said new screen to stored copies of said used screens and said stored old screen to determine if said new screen exhibits a preestablished level of similarity with a said stored screen and selecting a said stored screen that exhibits said preestablished level of similarity; and
(c) transmitting to said second processor, information regarding the difference between said new screen and said selected stored screen, and an identifier of said selected stored screen.

17. The method as defined in claim 16 further comprising:

(d) if no stored screen exhibits said preestablished level of similarity with said new screen, transmitting to said second processor information regarding the difference between said new screen and said old screen.

18. The method as defined in claim 16 further comprising the steps of:
   (e) determining if said new screen comprises mostly blank or null data, and if so,
   (f) eliminating step (b) and transmitting information to said second processor regarding differences between said old screen and said new screen.

19. The method as defined in claim 16, further comprising the steps of:
   (e) determining if said new screen is a scrolled version of a stored screen and if so found;
   (f) transmitting to said second processor, information as to a number of lines to scroll the copy of said determined screen stored in said second processor, and the differences between said new screen and said determined stored screen, after scrolling.

20. The method as defined in claim 19, wherein said determining step e compares said new screen against a plurality of stored screens.

21. The method as defined in claim 16 wherein step (b) includes the further step of:
   (b1) determining if said new screen has an identifier which matches an identifier of a stored screen in said first processor and if such a match is found, causing step (c) to transmit an instruction to said second processor to display said stored screen, followed by additional information regarding the differences between said stored screen with the matching identifier and said new screen.

22. The method as defined in claim 21 wherein said second processor, responds to said transmitted information in step (b1) by retrieving its copy of said stored screen with the matching identifier and modifying it in accordance with said difference information.

23. The method as defined in claim 16, wherein said comparing step (b) comprises the steps of:
   b1. comparing lines of data in said new screen with lines of data in stored screens to determine an identity therebetween; and
   b2. producing coded signals which indicate each line of data in said new screen which is identical to a line of data in a stored screen, and further indicates identifiers for identical lines in said stored screens and identifiers for said stored screens.

24. The method as defined in claim 23, wherein said comparing step (b) further comprises:
   b3. repeating said comparing step over a predetermined plurality of stored screens.

25. The method as defined in claim 24 wherein said transmitting step (c) comprises the further step of:
   c1. transmitting, for every identical line of data found in a stored screen, a coded signal to said second processor, whereby said second processor accesses said identical lines from its stored screens.

26. The method as defined in claim 16 wherein said preestablished level of similarity is exceeded when said comparison step (b) finds that a preset amount of data in a stored screen is identical to data in said new screen, said preset amount being less than the entirety of data in said stored screen.

27. The method as defined in claim 26, wherein said step (b) further comprises the step of:
   b1. cumulatively matching data segments of said new screen with data segments of a stored screen, said new screen being determined as non-matched with said stored screen when a preset count of non-matching data segments is reached, said preset count of data segments being less than a total number of data segments in said stored screen.

28. The method as defined in claim 27 wherein said step (b) further comprises the steps of:
   b2. cumulatively counting matching data characters of each segment of said new screen and a stored screen; and
   b3. classifying a data segment of said stored screen as non-matching when a predetermined count of non-matching data characters is reached, said number being less than a total number of data characters in a data segment.

29. The method as defined in claim 28 further comprising the steps of:
   b4. accumulating a count of matching data segments when said data segments of said new screen are compared with said data segments of said stored screen, and declaring a match when said count equals a predetermined number, said number less than a total number of data segments in a screen;
   b5. terminating any further matching upon the occurrence of said count; and
   b6. transmitting to said second processor information regarding the difference between said stored and new screens and an identifier of said stored screen.

30. The method as defined in claim 1 wherein said pre-established level of similarity is less than total identity between said new data block and any said stored data block copies.

31. The method as defined in claim 16 wherein said pre-established level of similarity is less than total identity between said new screen and said stored copy of a used or old screen.

* * * * *